Jan. 24, 1961 W. S. SWANSON ET AL 2,969,001
MILLING AND CENTERING MACHINE
Original Filed April 7, 1954 6 Sheets-Sheet 1

INVENTORS.
Walter S. Swanson
Paul M. Bert
David A. Hutchinson
By: Schroeder, Hofgren, Brady & Wegner
Attys.

Jan. 24, 1961

W. S. SWANSON ET AL 2,969,001

MILLING AND CENTERING MACHINE

Original Filed April 7, 1954

INVENTORS.
Walter S. Swanson
Paul M. Bert
David A. Hutchinson
By: Schroeder, Hoffman, Brady & Wegner
Att'ys

Fig. 14

United States Patent Office 2,969,001
Patented Jan. 24, 1961

2,969,001

MILLING AND CENTERING MACHINE

Walter S. Swanson and David A. Hutchinson, Rockford, Ill., and Paul M. Bert, Linden, N.J., assignors to Sundstrand Corporation, a corporation of Illinois Continuation of application Ser. No. 421,608, Apr. 7, 1954. This application Apr. 24, 1959, Ser. No. 808,843

6 Claims. (Cl. 90—59)

This invention relates to a new and improved machine tool, and more particularly to a workholder for a milling and centering machine.

This application is a continuation of our application Serial No. 421,608, filed April 7, 1954, now abandoned.

An object of this invention is to provide a new and improved milling and centering machine embodying new and improved means for supporting and aligning a somewhat cylindrical workpiece in a stationary position and in operable relation with a rockable spindle head carrying a centering tool and a milling cutter which is arranged to mill an end of the workpiece while swinging in an arcuate path during the rocking motion of the spindle head.

Another object is to provide a workholder embodying an interchangeable aligning bar removably supported at either end and positioned in a perpendicular relation to the plane in which the milling cutter swings with the rocking motion of the spindle head, vertically slidable vise jaws for gripping one end of a workpiece adjacent the milling cutter and centering tool, a work support on the bar operable to support an intermediate portion of the workpiece and an end stop device longitudinally adjustable on the bar and provided with a rotatable head carrying a center and a knob adapted for alternate axial engagement with alternate ends of the workpiece, respectively.

Another object is to provide a workholder having a pair of vise jaws engageable with a workpiece adjacent an end thereof, a work support engageable with the workpiece intermediate its ends, and means in engagement with the other end of the workpiece for determining the proper endwise location thereof comprising, a rotatable shaft with a stop and a center extending slightly beyond the stop, said center and stop being located equidistantly from the axis of shaft rotation whereby the stop may be aligned with an uncut workpiece and the center may be aligned with a workpiece cut across one end.

Further objects and advantages will become apparent from the following detailed description taken in connection with the accompanying drawings, in which.

While we have shown in the drawings and shall herein describe in detail a preferred embodiment of the invention, it is to be understood that we do not hereby intend to limit the invention to the specific forms disclosed. It is contemplated that various changes may be made by those skilled in the art without departing from the spirit and scope of the invention as expressed in the appended claims.

As illustrated in the drawings, the exemplary form of the invention is embodied in a machine tool having a welded box-like base 10 comprising, front and back plates 11 and 12, and left and right hand side plates 13 and 14. A central vertical partition plate 15 meets a horizontal frame member 16 to divide a portion of the base into cutting lubricant reservoir compartments 17 and 18. Vertical plates 19, 20 and 21 are positioned with an end portion of each bearing on top of frame member 16. A cut-away portion 22 is provided in plate 21 to allow for the downward arcuate rocking motion of a spindle head as hereinafter described.

Figure 1:
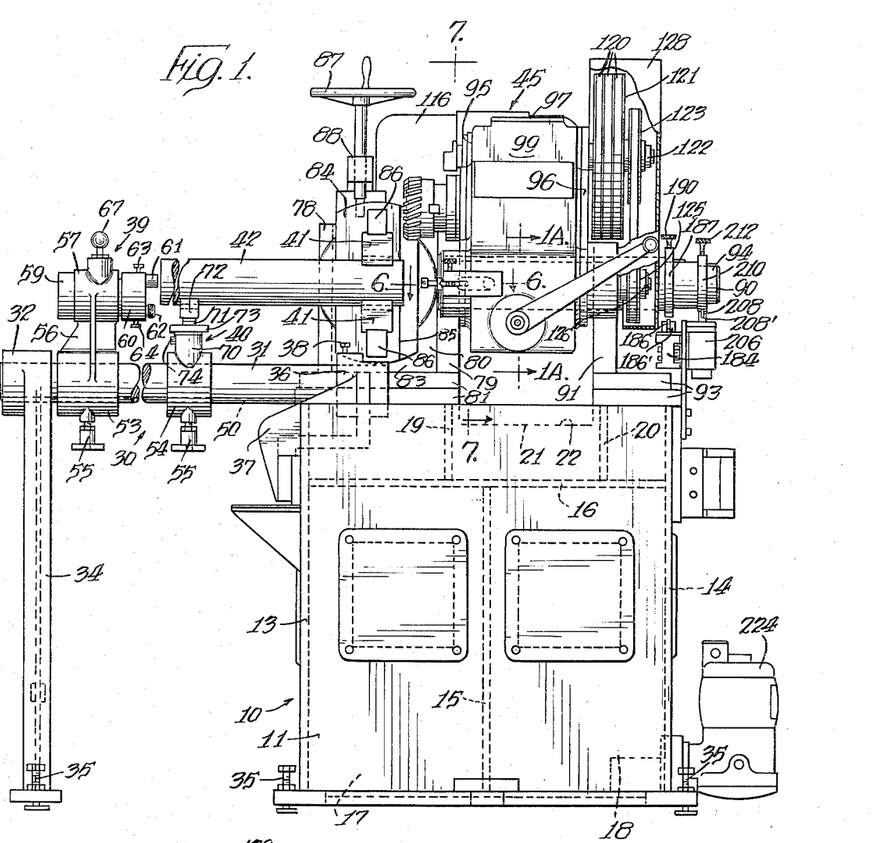
Fig. 1 is a front elevation view of the millinging and centering machine illustrating a preferred form of the invention.
Figure 7:
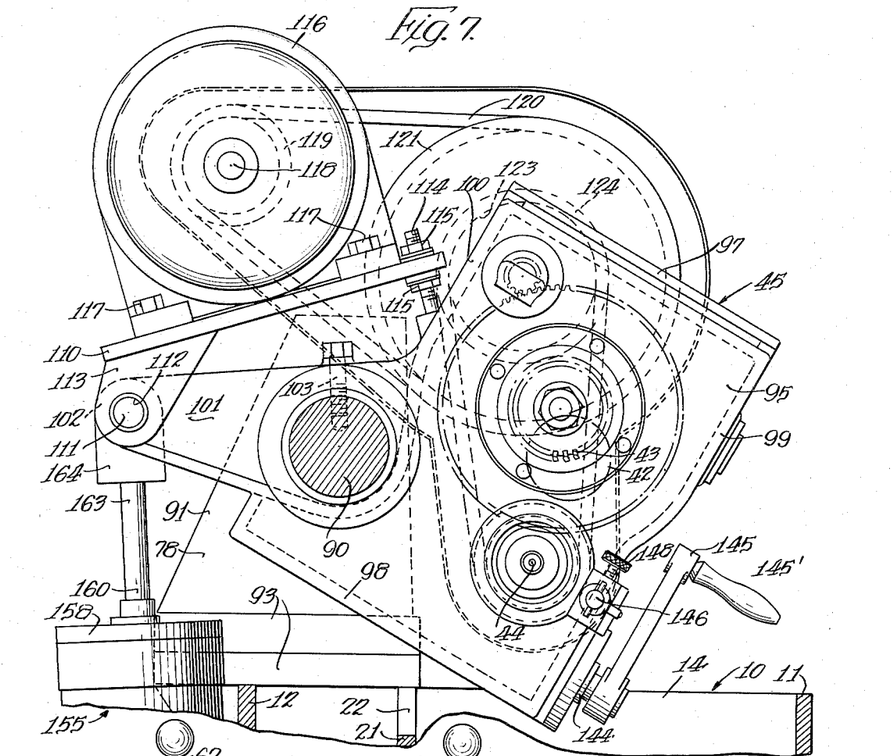
Fig. 7 is a fragmentary vertical sectional view taken along line 7—7 of Fig. 1 and showing the relationship of the various parts associated with the spindle head when the spindle head is rocking through the feed portion of its cycle.

A portion of a work-aligning device 30 extends from the left hand side of the base and generally comprises a cylindrical bar 31 positioned in a perpendicular relation to left hand side plate 13 and removably secured at its right hand end in a collar 36 welded to a bracket 37 which is fixed to left side plate 13. A tightening clamp 38 is threadably received in the collar for securing the bar in position. The bar is releasably secured at its left hand end in a collar 32 carrying a tightening clamp 33 and supported by legs 34 which may be secured to the floor by any suitable means and have levelling bolts 35. The bar 31 carries a slidable end stop device 39 and an intermediate work support 40 which cooperate with a pair of vertically movable vise jaws 41 to hold a cylindrical workpiece 42 in proper position to be faced by a milling cutter 43 and center drilled by a centering tool 44 both of which are carried by a spindle head 45 rockable on the base 10 about an axis parallel to the center line of bar 31. The construction and arrangement, described hereinafter, is such that the milling cutter is swung in an arc with the motion of the spindle head from a rest position, as shown in Fig. 1, through a downward rapid approach movement to advance the cutter to the vicinity of the workpiece, and then through a slow feed movement during which the milling cutter mills the adjacent end of the workpiece (Fig. 7). After a reverse rapid return movement of the spindle head to the rest position, the centering tool is axially aligned with the point of the adjacent end of the workpiece which is to be drilled and the drill spindle is then actuated to drill and counterbore a centering hole in the milled end of the workpiece.

The work-aligning device 30 may be adapted to handle substantially any length workpiece by substituting bars 31 of appropriate length and changing the position of legs 34 and collar 32 accordingly. Extremely short work may be positioned by the vise jaws 41 alone. The bar 31 may be provided with a horizontal longitudinal keyway 50 in its underside for receiving keys 51 and 52 fixed in slidable collars 53 and 54 of the end stop and work support respectively. Locking clamps 55 are threadably received in the underside of the collars for securing the end stop and work support in their adjusted positions.

Figure 8:
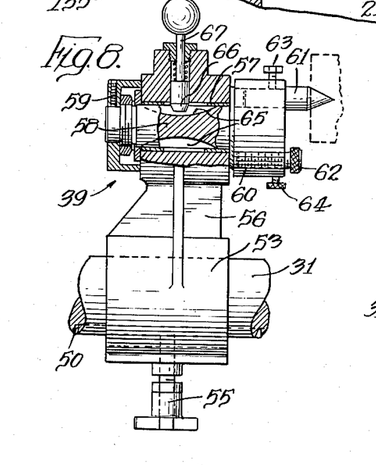
Fig. 8 is a front elevational view, partially in section, of the end stop.
Figure 9:
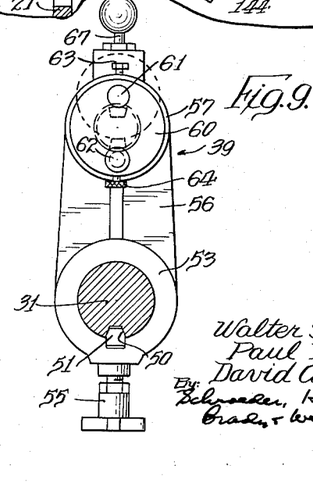
Fig. 9 is a side elevational view looking at the right hand side of the end stop as shown in Fig. 8.

The stop device 39 (Figs. 1, 8 and 9) is provided with an arm 56 extending upwardly from the collar 53 and providing a bore 57 for receiving a rotatable shaft 58, the left hand end of which carries an end plate 59. A cylindrical head 60 is fixed to the right hand end of the shaft and carries an adjustable center 61 and a screw-threaded knob 62, provided with set screws 63 and 64 respectively. The center point and knob are spaced equidistantly from the axis of rotation of the head 60 so that when either is in the upper position, as is the center in Figs. 1 and 8, it will be axially aligned with the workpiece 42. The upper and lower portions of the shaft 58 are cut away to form two-spaced flat surfaced concave cavities 65 engageable with the lower end 66 of a spring-urged plunger 67 which coacts with the cavities to secure the rotatable head 60 in the position as shown in Fig. 8 or in a position wherein the head is rotated 180° so as to position the knob 62 in the position of the center 61.

Figure 10:
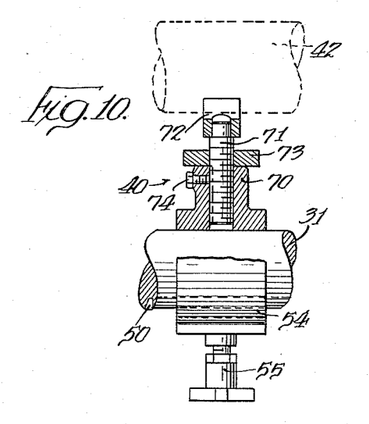
Fig. 10 is a front elevational view, partially in section, of the intermediate work support.
Figure 11:
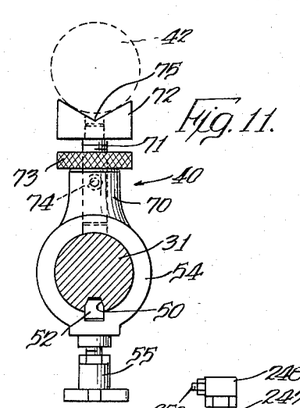
Fig. 11 is a side elevational view looking at the right hand side of the work support as shown in Fig. 10.

Intermediate work support 40 (Figs. 1, 10 and 11) is provided with an arm 70 which extends upwardly from the collar 54 and has a vertical bore slidably receiving a threaded member 71 which carries a V support 72. A nut 73 is threaded on vertical member 71 for vertically adjusting the V support 72. The inner end of a set screw 74 slides in a vertical slot in member 71 to prevent it from rotating. The construction is such that a vertical plane perpendicular to the left hand side of the base 10 will pass through the center lines of bar 31, the center 61, knob 62 and vertex 75 of the V support 72 and the vertices 76 (Fig. 2) of movable vise jaws 41, so that the workpiece is secured by the work-aligning device 30 in a position perpendicular to the vertical plane containing the arcuate path of the milling cutter.

The vise jaws 41 are operable for gripping the right hand end of the workpiece adjacent the milling cutter 43 and centering tool 44 to properly align the workpiece with respect thereto. The vise jaws are carried on a pair of members 86 which are slidably supported on a bracket 84, carried on the base, for movement vertically towards and from each other. The vise jaws may be manually operated by an actuating wheel 87 which is supported on a shaft 88 which may have oppositely threaded portions operable to actuate the vise jaws in a well known manner so that the jaws are always equidistant from a horizontal center line passing through the center 61 and the axis of workpiece 42 (and through centering tool 44 when the spindle head is in rest position as illustrated in Fig. 1).

Figures 2, 3:
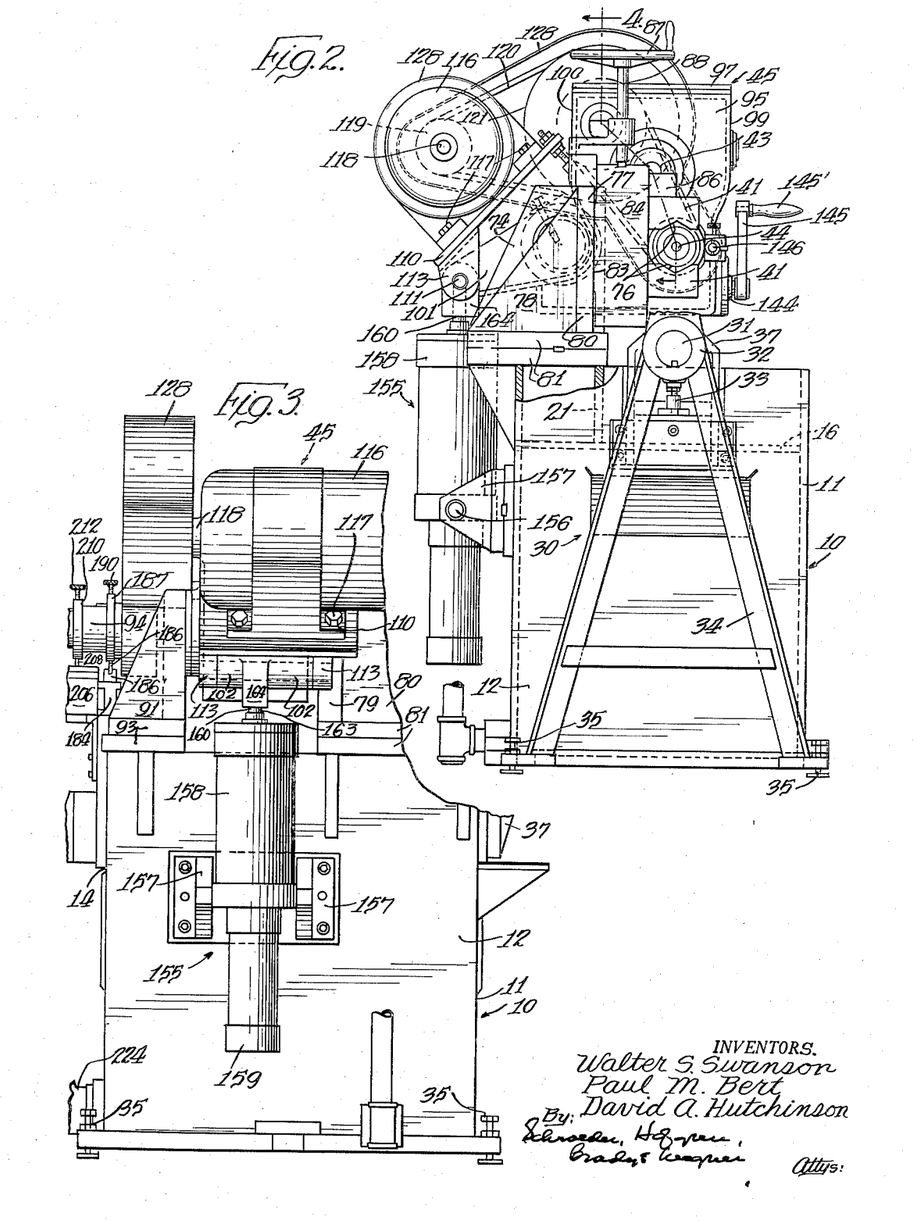
Fig. 2 is an end elevational view looking at the left hand end of the milling and centering machine as shown in Fig. 1 and with the end stop and intermediate work support broken away.
Fig. 3 is a fragmentary rear elevational view looking at the rear of the milling and centering machine as shown in Fig. 1 and with the work supporting means broken away.

The spindle head 45, as best shown in Figs. 1, 2 and 7 is carried on a rock shaft 90 which is supported on the base 10 in a position behind and parallel to the workpiece axis by upstanding brackets 79 and 91. A portion 94 of the shaft extends beyond the right hand end of trunnion bracket 91 (Fig. 1) for a purpose hereinafter described.

The spindle head generally has a box-like shape and is provided with substantially vertical sides 95 and 96, top member 97, a bottom member 98, a front member 99 and rear member 100. An arm 101 extends from the head towards the rear of the base (Fig. 7) and is provided with two spaced apart portions 102 carrying a horizontally extending pin 111. A bolt 103 is threadably received by the rock shaft for securing the spindle head thereto. The milling cutter 43 is carried by spindle 105 rotatably mounted in suitable bearings in a portion of sides 95 and 96 for rotation about an axis parallel to the workpiece axis and spaced above and in front of the rock axis. The centering tool which may comprise a drill portion 44' and reamer portion 44" is carried by a spindle 106 rotatably mounted in suitable bearings in a portion of side 95 below and slightly forward of cutter spindle 105 and rotates about an axis parallel to the workpiece axis.

Figure 4:
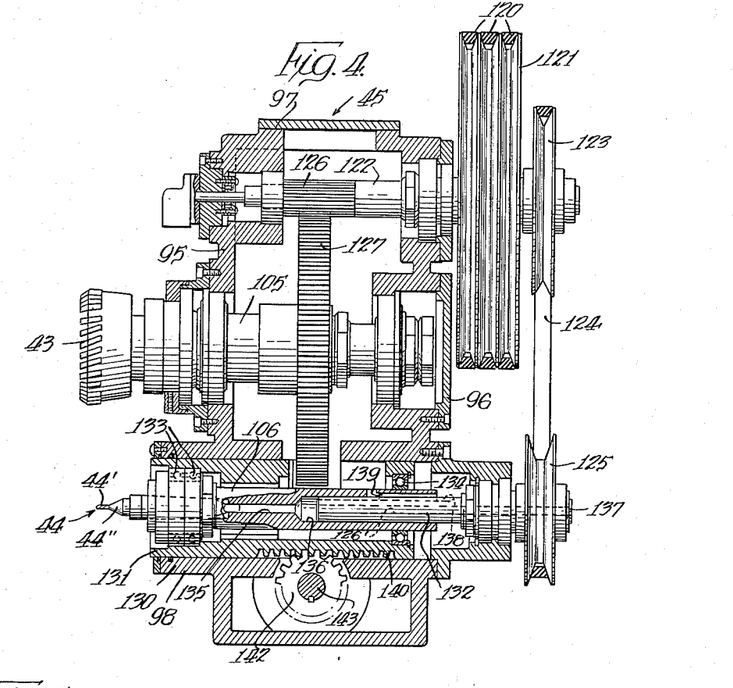
Fig. 4 is a fragmentary vertical sectional view taken along line 4—4 of Fig. 2, showing a portion of the means operable for causing rotation of the milling cutter and centering tool and for imparting linear motion to the centering tool.
Figure 5:
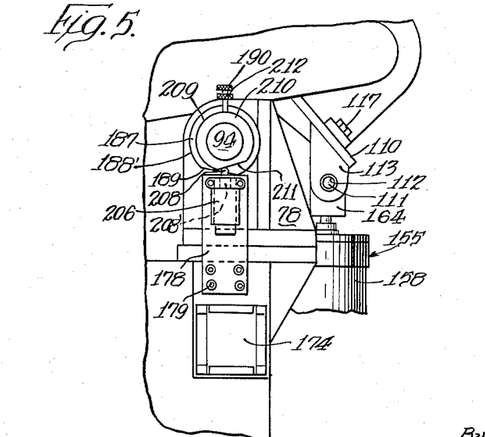
Fig. 5 is a fragmentary view looking at the right hand end of the milling and centering machine as shown in Fig. 1 and illustrating cam and valve means associated with the spindle head rock shaft.

Means for rotating the cutter and drill spindles are carried by the rockable head. A hinge comprising a plate 110 rotatably secured to arm 101 by brackets 113 which receive the ends of and adjustably secured at its front portion to the spindle head by a bolt 114 threadably received in the spindle head and secured to the plate by nuts 115 is provided as an adjustable base for an electric motor 116 secured to the plate by any suitable means as by bolts 117. As best illustrated in Figs. 1 and 4, drive shaft 118 extends from the right hand side of the motor and carries a pulley 119 mounting triple V belts 120 operable with a pulley 121 fixed to a driven shaft 122 having its ends journalled in suitable bearings in the head and rotatable about an axis parallel to the workpiece axis. Driven shaft 122 carries a second pulley 123 fixed thereto outwardly of pulley 121 and carrying a V belt 124 operable with a pulley 125 fixed to a shaft 132 keyed to the centering tool spindle 106. A portion of driven shaft 122 is cut away to form a spur gear 126 which meshes with a second spur gear 127 fixed to milling cutter spindle 105 for rotating the same. A cover assembly 128 is fixed to the spindle head for enclosing the milling cutter and drill spindle rotating means.

Figure 1A:
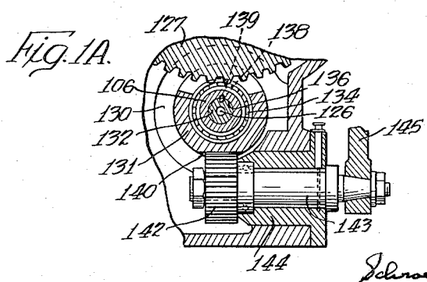
Fig. 1A is a fragmentary vertical sectional view taken along line 1A—1A of Fig. 1.

Mechanical means, as shown in Figs. 1A and 4, are provided for imparting linear motion to the centering tool. A portion of the spindle head structure forms a sleeve 130 receiving slidable spindle housing 131. Centering tool spindle 106 is rotatably positioned in the housing for sliding movement therewith longitudinally of a workpiece and is supported by suitable thrust bearings 133 and 134. A bore is provided in the spindle and has a portion 135 of small diameter and a communicating portion 136 of larger diameter which slidably receives the pulley shaft 132 provided with a keyway 138 slidably receiving key 139 fixed to the spindle so that the spindle may be rotated while moving toward and away from the workpiece. A bore 126' in the shaft 132 communicates at its left hand end with bore 136 and receives a pipe fitting 137 in its right hand end. The centering tool 44 is shifted longitudinally by contact of gear teeth 140 in the under portion of housing 131 with a meshing drive gear 142 keyed to shaft 143 which is journalled in sleeve 144. An arm 145 may be manually operated to rotate shaft 143.

An adjustable centering tool stop 146 (Fig. 6) engaged by a member 147 fixed to sleeve 131 to limit the forward movement of the centering tool while contact between member 147 and a portion 147' of sleeve 130 limits movement in a reverse direction.

Figure 14:
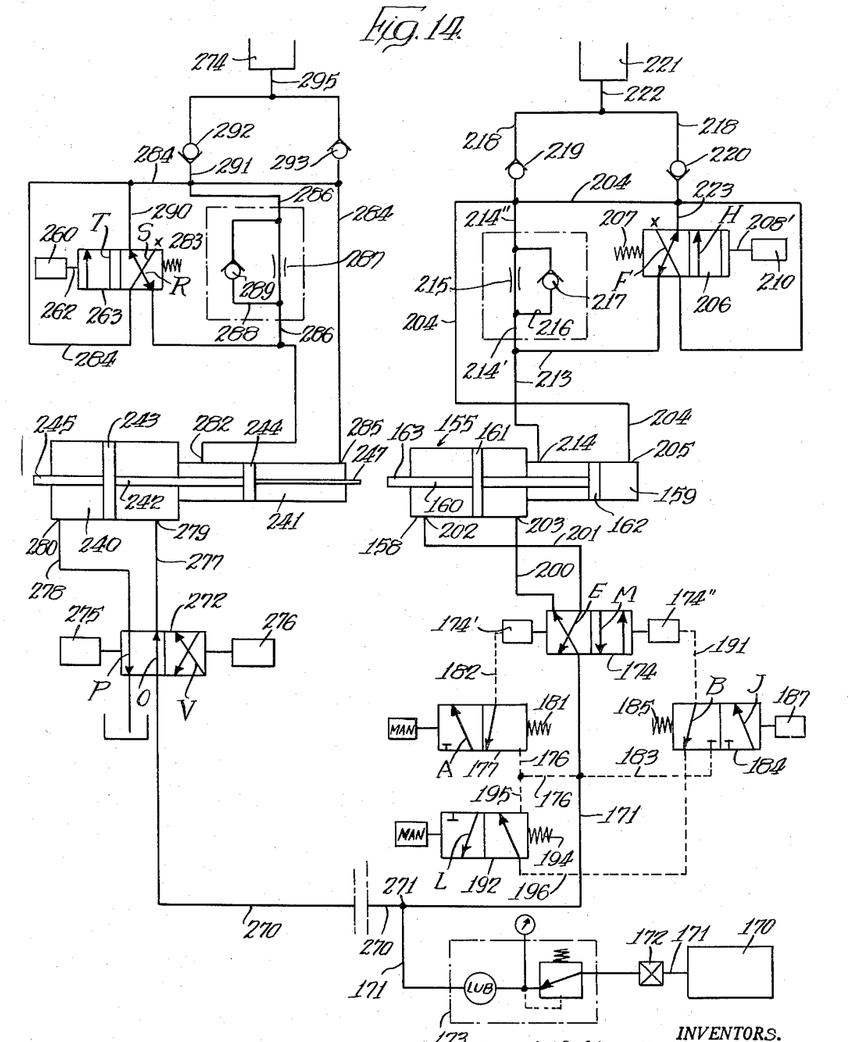
Fig. 14 is a schematic diagram illustrating the spindle head and centering tool air-hydraulic circuits.

As best illustrated in Figs. 2, 3, 7 and 14, rocking motion is imparted to the spindle head by a double acting air-draulic cylinder 155 rockably mounted on the base by pins 156 in brackets 157 fixed to the rear plate of the base. As best illustrated in Fig. 14, the air-draulic cylinder comprises an upper air cylinder 158 and a lower hydraulic cylinder 159, a piston rod 160, a piston 161 in the air cylinder 158 and a piston 162 in the hydraulic cylinder 159. The free end 163 of the piston rod is connected to the spindle head by a housing 164 rotatably receiving pin 111.

A cam-operated air and hydraulic fluid system is provided for actuating the air-draulic cylinder to rock the spindle head. As illustrated in Fig. 14, it embodies a source of compressed air 170, which may be available in a machine shop, connected by a main air line 171 through a gate valve 172, and a pressure gauge and air lubricating means 173 to one end of a two-position, four-way reversing valve 174 shiftable by an auxiliary circuit including air cylinders 174' and 174" for controlling the direction of movements of piston rod 160. The valve 174 when shifted by either cylinder 174' and 174" remains in that position until again shifted. The flow through the valves shown in Fig. 14 is in the direction indicated by the arrows and a double pointed arrow indicates that there will be flow in different directions at different times.

The auxiliary circuit, shown by dotted lines, has a branch line 176 connected to the main air line 171 and to one side of a three-way push button start valve 177 which may be mounted within reach of a machine operator and urged to an open position, as illustrated, by a spring 181. A line 182 connects the other side of the start valve 177 to the left hand end of control valve 174. When the start valve 177 is manually shifted against the spring 181, air pressure from line 171 shifts control valve 174 into the position shown. A line 183 connects air line 171 to one side of a two-position, three-way valve 184 normally urged to the position shown by spring 185. The valve is shifted against spring 185 when a roller 186 carried by valve stem 186' is moved by a high portion 188 of a cam 187 which has a low portion 189 and is mounted around rock shaft 90. A set screw 190 is provided for adjusting the rotative position of the cam with respect to shaft 90. When the valve 184 is shifted, a line 191 connects the valve to control valve 174 to shift the valve 174 to a left hand position for reversing the direction of piston 160.

An emergency two-position, three-way push button valve 192 is normally urged to the position shown by spring 194. A line 195 connects one side of the valve to line 176 and a line 196 connects the other side of the valve to valve 184. By shifting valve 192 to the right against spring 194, pressure shifts control valve 174 to the left hand position to reverse piston rod 160 during the rapid approach or feed portions of the cycle to return the spindle head to its initial position.

The lines 200 and 201 connect the control valve 174 to respective ports 202 and 203 of the air cylinder 158. A line 204 connects a port 205 of the hydraulic cylinder 159 to one side of a two-position, four-way valve 206 which is normally urged to the position shown by spring 207. Contact of roller 208 carried by valve stem 208' with a high portion 209 of cam 210 positioned around rock shaft 90 causes shifting of the valve. The cam 210 is adjustably secured on shaft 90 by set screw 212. The valve 206, when shifted to the right hand position by cam 210 plugs a line 213 connecting a port 214 of the hydraulic cylinder 159 with the valve. This causes fluid to flow through a line 214' and 214" connecting lines 204 and 213 with a conventional metering valve 215 to retard the flow of fluid to the opposite side of cylinder 159 and cause movement at a feed rate. A branch line 216 bypasses flow in one direction around the metering valve through a check valve 217 as described hereinafter.

A self-purging branch circuit is provided for utilizing volume differential created by the use of a single piston rod 106 in the hydraulic cylinder 159 and comprises a branch line 218 connecting line 204 with oppositely acting check valves 219 and 220 placed in series on either side of a fluid reservoir tank 221 connected by a line 222 to branch line 218. A line 223 connects with branch line 218, line 204 and with valve 206.

It is contemplated that suitable on-off electrical controls will be provided for the motor 116. A coolant pump 224 (Fig. 1) will be connected by suitable conduits for supplying fluid for use with the milling cutter and centering tool.

In operation of the invention, the knob 62 of the end stop 39 is swung into the upper position. A workpiece is positioned on the intermediate V support against the knob 62 and between the vise jaws 41 and the vice jaws 41 are then manually actuated into gripping position by wheel 87. The coolant pump 224 and electric motor 116 are operating and the milling cutter and centering tool spindles are rotating.

At the beginning of the cycle the spindle head is in its initial position, Figs. 1 and 2, and the piston 161 in cylinder 158 is in its lowest position. The rollers 186, 208 of the cam-operated valves 184 and 206 are out of contact with the high portions of their respective cams. The valves 184 and 206 are in the right hand positions as illustrated in Fig. 14. Gate valve 172 is open to allow passage of compressed air from the source 170 to control valve 174 which is in a left hand position. Valve 184, when in the right hand position, blocks line 183 to render the auxiliary circuit inoperative. The starting valve 177 is manually shifted against the spring 181 to a right hand position and air pressure from main line 171 passes through line 176, through valve passage A in valve 177, through line 182 and shifts control valve 174 to the right hand position, as illustrated in Fig. 14.

Release of valve 177 after valve 174 has shifted causes spring 181 to shift valve 177 back to its left hand position again rendering the auxiliary circuit inoperative and connecting line 182 to exhaust. The valve 174 will remain in shifted position until actuated in the other direction. With control valve 174 in the right hand position, air pressure is directed to port 203 in air-cylinder 158 to lift the piston rod 160 and actuate the spindle head through the rapid approach and feed portion of the cycle. As the piston moves upwardly, air is exhausted from cylinder 158 through port 202, line 201 and control valve passage E in valve 174 connected to exhaust. The piston 162 in the cylinder 159 moves upwardly with piston rod 160, and fluid is forced from port 214 of the cylinder through line 213, passage F of valve 206, line 223, line 204 and back into the other end of the hydraulic cylinder at port 205. In the position as illustrated, valve 206 allows hydraulic fluid to bypass the metering valve 215 so that the spindle head will rock through the rapid approach portion of the cycle.

Due to the single end piston rod 160, a larger volume of fluid will be required in the right hand end of cylinder 159 than will be forced from port 214 creating a slight vacuum. Check valve 219 automatically opens to supply the extra fluid from the reservoir 221.

As the spindle head nears the adjacent end of the workpiece, the high portion 209 of cam 210 on shaft 90 contacts roller 208 of valve 206 to shift the valve against the spring 207 to a left hand position. This changes the circuit to cause the feed portion of the cycle wherein the milling cutter cuts the end of the workpiece. The line 213 is now connected to passage H of valve 206 which is plugged at X, thus forcing hydraulic fluid to flow from port 214 through line 214', metering valve 215, line 214", line 204 and back into cylinder 159 through port 205. This meters the flow in the circuit to slow the rate of movement of piston 160 and the resultant rocking motion of the spindle head.

After the spindle head has completed the feed portion of the cycle and the milling cutter has milled the adjacent end of the workpiece, the piston rod 160 is nearing the end of its upper stroke or to the left (Fig. 14). The follower 186 of valve 184 is then engaged by the high portion 188 on cam 187 to shift the valve 184 to its left hand position against the action of spring 185. Air pressure passes through line 183, valve passage J in valve 184, and line 191 to shift the valve 174 to a left hand position. The valve 174, in its left hand position, directs air pressure to port 202 and connects port 203 to exhaust. This causes piston rod 160 to move in a downward direction (to the right in Fig. 14) to rock the spindle head through the rapid return portion of the cycle to its initial position. Immediately after the spindle head begins the rapid return, follower 186 rides free of the high portion of cam 187 and valve 184 shifts back to the right hand position.

Air is exhausted from the right hand end of cylinder 158 through port 203, line 200 passage M of control valve 174, to exhaust.

When the rapid return portion of the cycle commences, valve 206 remains in the left hand position and as the hydraulic piston 162 moves downwardly (to the right in Fig. 14), fluid is forced from port 205 through line 204, line 214, bypass line 216 which unseats bypass check valve 217, line 214', line 213, and port 214 to the left end of hydraulic cylinder 159. Check valve 217 allows free flow of hydraulic fluid in the circuit and the piston rod moves rapidly downward and the spindle head rocks upwardly toward its initial position.

When the milling cutter swings past the position where the feed part of the cycle previously occurred, follower 208 for cam 210 disengages from high portion 209 and permits spring 207 to shift valve 206 to the right hand position, as illustrated in Fig. 14. Hydraulic fluid flows through passage F of valve 206 to line 213 and port 214 to permit the maximum rate of return of the spindle head.

As the volume of fluid forced from port 205 is greater than the volume which may pass through port 214 in cylinder 159, check valve 220 will unseat to allow flow of the excess volume to reservoir 221, at the same time purging any air in the circuit.

If the emergency return valve 192 is manually shifted to a right hand position against the action of spring 194, air pressure will flow from line 171, through line 176, line 195, valve passage L, line 196, passage B in valve 184 and line 191 to shift the control valve 174 to its left hand position. It will be seen that the emergency valve 192 reverses rocking motion of the spindle head to begin the rapid return portion of the cycle, when desired.

As shown in Fig. 1, the centering tool is automatically aligned with a center line through the workpiece when the spindle head is in rest position. The handle 145 may then be actuated to move the centering tool into and out of engagement with the milled end of the workpiece for drilling and reaming a conical center hole therein.

The operations for milling and centering the left hand or unworked end of the workpiece are, of course, the same as for the right hand end once the workpiece is reversed. The head 60 of end stop 39 is rotated 180° to the upper position as shown in Fig. 1 and tailstock center 61 is positioned to fit in the conical center hole of the previously worked end of the workpiece. The center point extends to the right beyond the right extremity of knob 62 to compensate for the reduced length of the workpiece from the previous milling operation and the depth of the center hole receiving the center point 61 so that the unworked end of the workpiece adjacent the spindle head is positioned in the same spaced relation to the milling cutter and centering tool as the other end of the workpiece.

If desired, the manual means for imparting linear motion to the centering tool may be replaced by an automatic cam-operated air-draulic circuit (Fig. 14) added to the circuit for the spindle head without modification of the latter. The left hand side of Fig. 14 shows this added circuit connected at 271 to the air line 171. The broken lines in a line 270 indicate the separability of the added circuit and that it may be readily added when automatic movement of the centering tool is desired.

Figure 12:
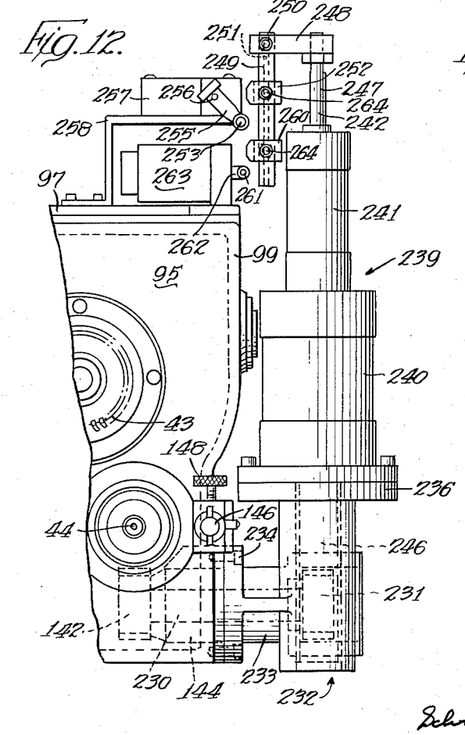
Fig. 12 is a left hand side elevation of a portion of the spindle head as shown in Fig. 1, modified to show a piston and cylinder device and a portion of the air-hydraulic circuit means which may be used instead of manual means for automatically reciprocating the centering tool.
Figure 13:
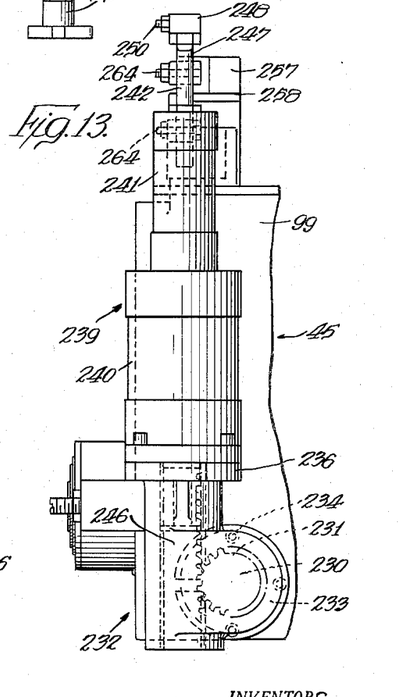
Fig. 13 is a front elevational view of the modified spindle head and looking at the right hand side of Fig. 12.

As illustrated in Figs. 12 and 13, a shaft 230 slightly longer than shaft 143 is used and carries a gear 231. An L shaped housing 232 having a portion 233 is fixed to the front member 99 of the rockable spindle head as by bolts 234. The housing has a double acting air-draulic cylinder 239 secured to a flange 236. The cylinder 239 is similar to the cylinder 155 of the spindle head circuit except that cylinder 239 has a double end piston rod and cylinder 155 has a single end piston rod.

As best illustrated in Figs. 12, 13 and 14, the cylinder 239 comprises a lower air cylinder 240, and an upper hydraulic cylinder 241. A double end piston rod 242 carries a piston 243 slidable in the air cylinder 240 and a piston 244 slidable in the hydraulic cylinder 241. The lower end 245 of the piston rod extends from the bottom of the air cylinder and carries a rack 246 meshing with gear 231 for causing rotation of shaft 230 to impart linear motion to the centering tool 44.

The uppermost portion 247 of the piston rod 242 is of a diameter smaller than the remainder of the rod to create a volume differential in the circuit for operation of a self-purging portion of the circuit, as subsequently described. The upper end of the rod extends beyond the hydraulic cylinder 241 and carries a laterally-extending arm 248. An arm 249 depends from arm 248 parallel to piston rod 242 and is adjustably secured to arm 248 by a set screw 250 operably associated with a groove 251 in the arm. Arm 249 carries an adjustable upper dog 252 engageable with a roller 253 of switch arm 255 normally urged to the position shown and pivotally mounted by a pin 256 to a timer device 257 which is secured to a bracket 258 to the spindle head. An adjustable lower dog 260 positioned on arm 249 is engageable with a roller 261 carried by arm 262 of a two-position, four-way valve 263 fixed to the top of the spindle head. Set screws 264 are provided for securing the dogs in selected position on arm 249.

As best illustrated in Fig. 14, the centering tool circuit comprises an air line 270 which may be connected at one end 271 to the main air line 171 and at the other end to one side of a four-way control valve 272 shiftable by air solenoids 275 and 276 which shift the valve 272. The control valve 272 directs air to cylinder 240 to cause reciprocation of piston rod 242 for imparting linear motion to the centering tool. The lines 277 and 278 connect the opposite side of valve 272 to respective upper and lower parts 279 and 280 of air cylinder 240. A line 281 is connected to a port 282 of hydraulic cylinder 241 and to one side of a four-way valve 263 normally urged to the position shown in Fig. 14 by a spring 283. Any suitable electrical controls for the air solenoids 275 and 276 and the connection of timer 257 to air solenoid 275 may be provided.

The valve 263, when in the left hand position, plugs a line 284 connected to an upper port 285 of the hydraulic cylinder to cause fluid to flow through a line 286 connecting lines 284 and 281 and a metering valve 287 to meter fluid flow during the feed portion of the work centering cycle. A branch line 288 is connected to line 286 in parallel with the metering valve 287 and bypasses flow around the metering valve in one direction through a check valve 289. A line 290 connects the valve 263 with the line 284.

A self-purging circuit is provided for utilizing volume differential created by the reduced portion 247 of piston rod 242 and comprises a branch line 291 connected at one end to lines 284 and 286 at their junction and having oppositely acting check valves 292 and 293 placed in series on either side of a fluid reservoir tank 294 connected by line 295 to branch line 291. The line 291 is connected at its other end to the line 284.

After the spindle head has rocked from its initial position through the rapid approach, feed, rapid return movements the centering tool is automatically aligned with the center line of the workpiece and ready to be automatically moved through a centering cycle. In this cycle, the tool is moved from a rest position (Figs. 4 and 12) through a forward rapid approach movement toward the workpiece, a feed portion of the cycle wherein a conical center hole is drilled and reamed in the end of the workpiece, and a reverse rapid return to the initial rest position.

Prior to commencing the cycle, the control valve 272 is in a left hand position and the piston rod 242 at its upper limit position. Air solenoid 276 is momentarily energized and shifts the control valve to the right hand position as illustrated to begin the rapid approach portion of the cycle. Compressed air passes from the main line 171 through line 270, valve passage O of valve 272, line 277, port 279 and into the air cylinder to move the piston downwardly to begin the rapid approach movement of the centering tool. As the piston 243 moves downwardly, air is exhausted from port 280 of the air cylinder through line 278, valve passage P of valve 272 to exhaust. As hydraulic piston 244 moves downwardly, hydraulic fluid passes from the cylinder port 282 through line 281, valve passage S of valve 263, line 290, line 284, and cylinder port 285 to the hydraulic cylinder. As flow in the hydraulic circuit is unmetered, the piston rod 242 moves rapidly downward to drive shaft 230 and the centering tool advances rapidly toward the work.

Figure 6:
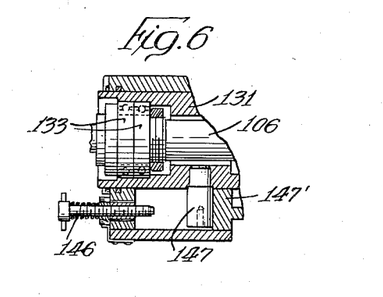
Fig. 6 is a fragmentary horizontal sectional view taken along line 6—6 of Fig. 1 and showing the adjustable stop means for limiting the forward movement of the centering tool and the means for limiting the reverse rearward movement thereof.

As illustrated in Figs. 12 and 13, the piston rod moves downwardly during the rapid approach portion of the cycle and as dog 260 is carried downwardly by the motion of the piston and as the centering tool nears the workpiece the dog 260 contacts roller 261 to move arm 262 and shift the valve against the spring 283 into a right hand position for beginning the feed portion of the cycle. Line 281 is now connected to a passage T of valve 263 which is plugged at x thus forcing hydraulic fluid to flow through line 286, metering valve 287, line 286, line 284 and back through cylinder port 285 to meter fluid flow in the circuit and slow the advance of the centering tool to the feed rate. A larger volume of fluid can be received through cylinder port 285 than will be forced from the cylinder port 282 creating a slight vacuum and check valve 293 will be unseated during the rapid approach and feed portions of the cycle to supply the volume of fluid needed from the reservoir 274. As the vertical dog arm 249 continues to move downwardly with the motion of the piston rod, dog 252 contacts roller 253 of switch arm 255 to actuate the timing device 257, which energizes solenoid 275 to shift valve 272 for beginning the rapid return portion of the cycle a short time after the centering tool motion through the feed portion of the cycle has been terminated by positive contact between tool stop 146 and member 147 (Fig. 6). The centering tool rotates for a short period at the end limit of its forward position to clear the centering hole of scrap metal.

When valve 272 is shifted to its left hand position by solenoid 275, the piston rod 242 moves in a reverse direction for moving the centering tool through the rapid return portion of the cycle. Air pressure passes from line 171 through line 270, valve passage V of valve 272, line 278 and port 280 of the air cylinder to force the piston upwardly. Air is exhausted from the air cylinder through port 279, line 277, valve passage W of valve 272 to exhaust. Hydraulic piston 244 moves upwardly and pressure fluid is forced from port 285, through line 284, the line 286 and metering valve 287, line 281 and to port 282 of the hydraulic cylinder. Hydraulic fluid also passes through line 288 to unseat check valve 289 to allow unmetered flow in the circuit so that the piston rod 242 moves rapidly upward and the centering tool passes rapidly through the rapid return portion of the cycle. During the first portion of the rapid return movement, dog 260 remains in contact with roller 261 and valve 263 remains in the right hand position (Fig. 14). As dog 260 passes out of contact with roller 261, valve 263 is shifted by spring 283 to its left hand position. The line 290 now connects the lines 284 and 281 through passage R in valve 263 and pressure fluid flows through line 281 and port 282.

As the volume of fluid forced from port 285 is greater than the volume which may pass into port 282, check valve 292 will unseat to allow flow of the excess volume to reservoir 274, at the same time purging any air in the circuit. Piston rod 242 continues moving upwardly until it has reached the end limits of its upward motion and linear motion of the centering tool is terminated by contact between member 147 and portion 147' of sleeve 130.

We claim:

1. A workholder for milling and centering machine which successively mills and centers opposite ends of a workpiece, comprising, an upstanding base, a pair of vise jaws mounted on said base for simultaneous movement in a plane toward and away from each other to engage the workpiece adjacent to an end thereof, means for supporting the length of the workpiece extending away from the vise jaws comprising a bar secured at one end to the base generally beneath the vise jaws and extending horizontally outwardly of the base in the same direction as the workpiece, a leg and collar assembly in engagement with and supporting the other end of the bar, a work support adjustably mounted on the bar and having a V-shaped support engageable with the workpiece intermediate its ends, and means in engagement with the free end of the workpiece for determining the proper endwise location of the workpiece with respect to the vise jaws including an upright arm secured to the bar and having a rotatable shaft provided with an endwise adjustable center and an endwise adjustable stop on said shaft and extending toward the free end of the workpiece, said center extending slightly beyond said stop and said center and stop being located equidistantly from the axis of rotation of said shaft, the construction and arrangement being such that the stop gauges the workpiece for the milling of the first end thereof and the center gauges the workpiece for the milling of the second end upon reversal of the workpiece and compensates for the length of stock milled off the first end.

2. A workholder comprising, an upstanding base, a pair of vise jaws mounted at one side of said base for simultaneous movement in a plane toward and away from each other to engage a workpiece adjacent an end thereof with the workpiece extending horizontally outwardly from the base, means for supporting the length of the workpiece extending away from the vise jaws comprising a bar of approximately the same length as the workpiece secured at one end to the base generally beneath the vise jaws and extending horizontally outwardly of the base, a leg assembly in engagement with the other end of the bar, a work support adjustably mounted on the bar and engageable with the workpiece, intermediate its ends, and means in engagement with the free end of the workpiece for determining the proper endwise location of the workpiece with respect to the vise jaws including an upright arm secured to the bar and having an adjustable center and an adjustable stop alternately positionable in line with the free end of the workpiece, said center extending slightly beyond said stop, the construction and arrangement being such that the stop gauges the workpiece for removal of material from the first end thereof and the center gauges the workpiece for removal of material from the second end upon reversal of the workpiece and compensates for the length of stock removed from the first end.

3. A workholder for a workpiece comprising, an upstanding base, a pair of vise jaws mounted on said base for simultaneous movement in a plane toward and away from each other to engage the workpiece adjacent to an end thereof, means for supporting the length of the workpiece extending away from the vise jaws comprising a bar secured at one end to the base generally beneath the vise jaws and extending away from the base in the same direction as the workpiece, a leg assembly in engagement with and supporting the other end of the bar, and means in engagement with the free end of the workpiece for determining the proper endwise location of the workpiece with respect to the vise jaws including an upright arm secured to the bar and having a rotatable member provided with a center and a stop extending toward the vise jaws, said center extending slightly beyond said stop and said center and stop being located equidistantly from the axis of rotation of said member.

4. A workholder comprising, an upstanding base, a pair of vise jaws mounted at one side of said base for simultaneous movement in a plane toward and away from each other to engage a workpiece adjacent an end thereof with the workpiece extending horizontally outwardly from the base, means for supporting the length of the workpiece extending away from the vise jaws comprising a bar secured at one end to the base generally beneath the vise jaws and extending horizontally outwardly of the base, a leg assembly in engagement with the other end of the bar, a work support adjustably mounted on the bar and engageable with the workpiece, intermediate its ends, and means in engagement with the free end of the workpiece for determining the proper endwise location of the workpiece with respect to the vise jaws including an upright arm secured to the bar and having an adjustable center and an adjustable stop alternately positionable in line with the free end of the workpiece, said center extending slightly beyond said stop.

5. In combination, an upstanding base, a horizontal bar which has its inner end secured to said base, legs supporting the outer end of said bar, an upstanding intermediate supporting cradle adjustably mounted on the bar, a pair of vise jaws mounted on the base above the inner end of the bar and simultaneously movable in a plane to grip a workpiece the intermediate portion of which is supported on said cradle, and an upstanding end stop assembly mounted on the outer end of the bar, said assembly comprising a rotatable shaft, an endwise adjustable center and an endwise adjustable stop equidistant from the axis of said shaft and extending toward the base, said center extending beyond said stop, said shaft being rotatable to position said stop abutting an end of a workpiece supported in said jaws and cradle to locate a first end of the workpiece with reference to the jaws for a cut on said first end, said shaft being further rotatable to position said center in axial engagement with said first end upon reversal of the workpiece to locate the other end of the workpiece for cutting and compensate for the length of stock cut off the first end.

6. A workholder for a workpiece comprising, an upstanding base, a vise mounted on said base for engaging the workpiece adjacent to an end thereof, means for supporting the length of the workpiece extending away from the vise comprising a bar secured at one end to the base generally beneath the vise and extending horizontally outwardly of the base in the same direction as the workpiece, a leg assembly in engagement with and supporting the other end of the bar, a work support mounted on the bar and having a support engageable with the workpiece, and means in engagement with the free end of the workpiece for determining the proper endwise location of the workpiece with respect to the vise including a rotatable shaft mounted on the bar and provided with a center and a stop extending toward the vise, said center extending slightly beyond said stop and said center and stop being located equidistantly from the axis of rotation of said shaft, whereby the workpiece may be properly located in the vise by the stop for machining of one end and again properly located by the center for machining of the other end.

No references cited.